United States Patent Office 3,436,969
Patented Apr. 8, 1969

3,436,969
FLUID VORTEX SPIN SENSOR
Edwin R. Phillips, Rosemont, Pa., assignor to Sperry Rand Corporation, New York, N.Y., a corporation of Delaware
Filed Apr. 12, 1965, Ser. No. 447,234
Int. Cl. G01p 19/00
U.S. Cl. 73—505
5 Claims

ABSTRACT OF THE DISCLOSURE

A fluid vortex spin sensor is disclosed which includes a cylindrical vortex chamber adapted for rotation about its axis. A source of constant pressure fluid is introduced into said chamber at the perimeter thereof. An annularly shaped fluid coupling couples the fluid at the perimeter of the chamber into the interior region of the chamber. The coupling means is operative to impart a tangential velocity to the fluid as it passes therethrough. An exit nozzle located at the axis of the chamber vents the chamber to atmosphere. A recovery channel located in line with the exit nozzle and spaced therefrom couples a utilization device to the spin sensor.

---

This invention relates to a fluid vortex spin sensor, and more particularly, to a pure fluid device which, when rotated, produces a fluid output whose value depends upon the rotational speed.

Prior art devices employing a fluid vortex to measure rotational speed have attempted to sense the high tangential fluid velocity near the outer periphery of the vortex at its greatest radius. The type of pick off means necessary to sense the tangential fluid velocity at said greatest radius point is difficult and expensive. Furthermore, the amount of power which can be extracted in this manner is extremely low, since disturbance introduced by the pick off of vortex flow must be kept low. Although it is possible in these prior art devices to obtain fairly high power drainage of the vortex, the sensing circuit in such case requires a large profile pick off.

The present invention obviates the above difficulties by relying upon a characteristic of the device which is based upon the principle that the resistance to fluid flow which exists across the vortex is a function of the strength of the vortex which in turn is proportional to the rotational speed being sensed. By employing a fluid isolator concept at the vortex exit (placed at the smallest radius of the vortex) the effect of a change in fluid resistance can be measured in terms of output flow and pressure. Another advantage in employing a fluid isolator at the exit is that said vortex resistance is immune from the effect of any change in the load, for example as may be provided by the next stage impedance. Therefore, all changes in the vortex resistance are a result of only rotational speed changes.

Therefore, one object of the present invention is to provide a fluid vortex spin sensing device unaffected by changes in an output load.

A further object of the invention is to provide a vortex spin sensor element which derives its output at the smallest vortex radius.

Another object of the present invention is to provide a fluid vortex spin sensor element constructed with a built in biasing effect so as to permit operation at the highest possible gain.

One more object of the present invention is to provide a dual push-pull fluid vortex spin sensor for use in a bridge circuit control system.

These and other objects of the present invention will become apparent during the course of the following description, to be read in view of the drawings in which:

FIGURES 1a and 1b respectively show two partially cut away views of one embodiment of the present invention as mounted for rotation about an axis;

Figure 1A:
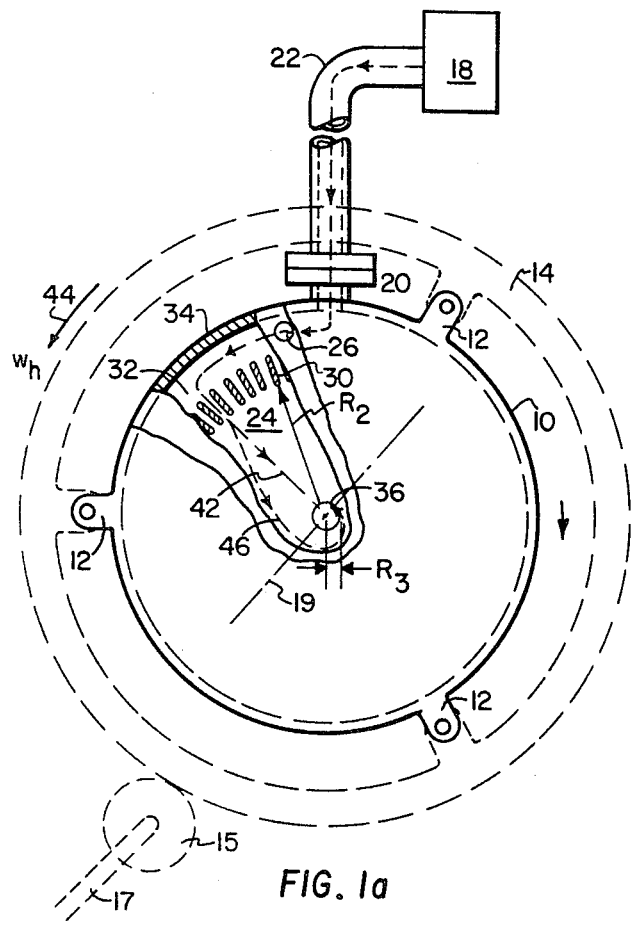
Figure 1B:
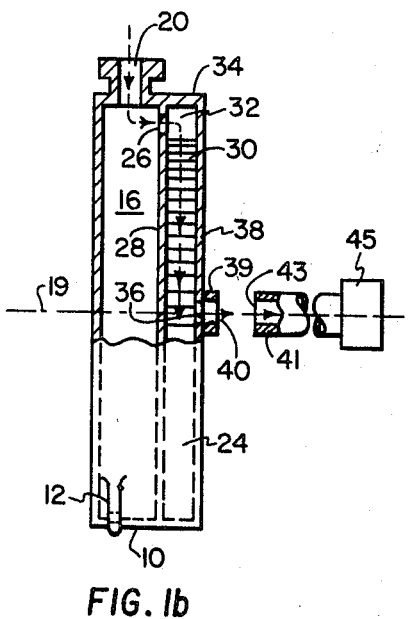

FIGURES 1a and 1b show a disk-like cylindrical housing member 10 connected, by means of ears 12 extending therefrom, to and within a mounting ring 14 (shown in dotted form) which in turn may be rotated via gear 15 and shaft 17 by any power means whose angular speed is to be measured. Alternatively, mounting ring 14 may be part of a speed control system wherein the sensor device 10 is employed to maintain a predetermined speed in the manner hereinafter to be described. Ring 14 is supported by means not shown so that housing member 10 is rotatable about its center axis 19. Other means different from ring 14 may be employed to permit housing rotation about axis 19, according to the particular environment in which the invention is used. Housing 10 includes an internal air manifold or plenum chamber 16 connected to a source of pressured fluid 18 via an air supply port 20 and conduit means 22 in any well known manner to allow for the rotation of housing 10. Although any liquid is useable in the device, the gain would probably be much lower than if a gas were employed. Air is the preferred fluid where the device is to be used in the atmospheric environment. Housing 10 further includes a hollow interior portion 24 etxending parallel to the panel of rotation and communicating with manifold chamber 16 by means of one or more ports 26 located in a common end wall 28 near the periphery of the housing. Interior portion 24 also contains a plurality of spaced apart vanes 30 circumferentially disposed about the axis of rotation 19 at a radius $R_2$ therefrom, and located between said axis 19 and ports 26, such that the fluid pressure existing in manifold 16 is communicated to a space 32 between vanes 30 and the outer peripheral wall 34 of the housing. Located at the axis of rotation 19 is a fluid exit port 36 in the outer end wall 38 of housing 10 which is in communication with interior portion 24. The radius $R_3$ of exit port 36 is substantially smaller than radius $R_2$ at which the vanes 30 are located from axis 19. Furthermore, the cross-sectional flow area of port 36 lies parallel to the plane of rotation of housing 10 so that fluid flow through interior 24 from vanes 30 makes a right angle turn in order to exit through port 36.

An isolating nozzle 39 is attached to wall 38 in alignment with port 36 so as to accelerate the fluid flow exiting from housing 10. The nozzle orifice 40 is vented to the ambient environment (the atmosphere where air is the fluid). The fluid jet from orifice 40 is recovered in a channel 41 whose entrance 43 is positioned downstream from orifice 40 by a distance equal to several orifice diameters. Channel 41 conveys the recovered fluid to a fluid sensing means 45 which acts as the load for the spin sensor unit. In this way any downstream effects, due to changes in the load, etc., cannot affect the upstream pressures and flow existing in housing 10. Thus, the separated isolator nozzle 39 and recovery channel 41 together act as fluid insolator means inserted between the downstream load 45 and the upstream fluid source 18. Although nozzle 39 is shown to be tapered to orifice 40 which is smaller than port 36, this tapered configuration may not be necessary because there is already a certain amount of fluid acceleration automatically provided by the decrease in the flow path area within portion 24 itself, i.e., fluid enters said portion 24 through a cross-sectional flow area at vanes 30 which is proportional to the circumference of a circle of large radius $R_2$, the spacing between vanes, and the vane width, with said fluid exiting from port 36 of normally much smaller cross-sectional flow area.

In the embodiment of FIGURES 1a and 1b, each vane 30 is oriented with its length dimension parallel to a radial line extending from the axis of rotation 19. Consequently, the axis of fluid flow between each adjacent pair of vanes 30 also is radial with respect to the axis of rotation 19, such that fluid molecules as they issue from between each adjacent pair of vanes 30 into interior portion 24 are initially directed toward axis 19. If housing 10 is stationary, i.e. at zero spin, then the fluid pressure differential between space 32 and exit port 36 causes each fluid stream emanating from between adjacent vanes 30 to have the radial path illustrated by dash line 42 in FIGURE 1a. For this condition, then each fluid molecule flowing from vanes 30 to port 36 therefore has only an inwardly directed radial velocity, as caused by the pressure differential between source 18 and load 45, but does not have any tangential velocity. If now housing 10 spins in the counterclockwise direction indicated by arrow 44, each fluid molecule, in passing between a pair of adjacent vanes 30, makes contact with one vane moving in said direction of housing rotation such that angular momentum of housing 10 is imparted thereto. This means that each fluid molecule upon entering into interior portion 24 will have both a tangential velocity component in the direction of housing rotation which is proportional to the housing spin velocity, as well as a radial velocity component toward port 36. The flow path from vanes 30 to port 36 for each fluid stream therefore becomes somewhat like a vortex as shown by dash line 46 in FIGURE 1a. For the condition of housing rotation, the value of the tangential velocity component of each molecule when it reaches exit port 36 is greater than the value of the tangential velocity component given it at the time when it leaves vanes 30. This is because the molecule angular momentum at radius $R_2$ must be equal to its angular momentum at $R_3$, which in turn means that the decrease in radius of molecule rotation about axis 19 as it approaches port 36 must result in an increase in its tangential velocity in order to maintain said momentum equality.

The phrase "resistance across the vortex" is applied to the characteristic of the device which causes a pressure drop therein of fluid flowing therethrough from vanes 30 to port 36. When the fluid molecules have no tangential velocity component, the fluid flows radially to exit port 36 with a minimum pressure drop through interior portion 24. However, when the assembly rotates, the fluid is caused to enter into a vortex type flow so as to have a high tangential velocity at port 36 thereby increasing the pressure drop, i.e. increasing the fluid resistance of the flow path through portion 24. To make use of this change in pressure drop, or resistance to flow, the inlet pressure to vanes 30 is held constant (as by use of the plenum chamber 16 fed by source 18), and the change in the fluid flow quantity to load 46 is measured. For example, this change in flow at the vortex exit can be dropped across a fixed fluid resistance in load 45, so that the resultant pressure drop across said fixed resistance is called the output signal. This fixed fluid resistance can be the input impedance to a subsequent amplifier stage.

To illustrate the increase in tangential velocity as the radius decreases, consider the mathematical treatment given below.

Let:

$m$ = mass of fluid molecule $w_h$ = angular rotation of housing 10 in radians/sec.

$w_2$, $w_3$ = angular rotation of fluid molecule at radius $R_2$, $R_3$ in radians/sec.

$I_2$, $I_3$ = moment of inertia of fluid molecule at radius $R_2$, $R_3$ $M_2$, $M_3$ = angular momentum of fluid molecule at radius $R_2$, $R_3$ $Vt_2$, $Vt_3$ = tangential velocity of fluid molecule at radius $R_2$, $R_3$ Then:

(1) $I_2 = mR_2^2$; $I_3 = mR_3^2$ (2) $w_2 = w_h$ (where vanes 30 are so oriented as in FIGURES 1a and 1b to give $Vt_2 = 0$ for $w_h = 0$)

(3) $M_2 = I_2 w_2 = mR_2^2 w_h$; $M_3 = I_3 w_3 = mR_3^2 w_3$ but $M_2 = M_3$ (conversation of momentum)

Thus:

(4) $mR_2^2 w_h = mR_3^2 w_3$ (5) $w_3 = \dfrac{R_2^2}{R_3^2} w_h$ (6) $Vt_2 = R_2 w_2 = R_2 w_h$ (7) $Vt_3 = R_3 w_3$ (8) $Vt_3 = R_3 \dfrac{R_2^2}{R_3^2} w_h = \dfrac{R_2^2}{R_3} w_h = \dfrac{R_2^2}{R_3} w_2 = \dfrac{R_2}{R_3} Vt_2$ From Equation 8 above it can be seen that a very high value of tangential velocity $Vt_3$ can be obtained from a relatively low $w_h$ if the ratio $R_2^2/R_3$ is made very large. The change of resistance across the vortex is produced because $Vt_3$ becomes very large. It has further been discovered that the change of fluid resistance of the vortex with change in the value of $w_2$ is not linear. Also, the change of resistance versus change in $w_2$ is maximum at some predetermined null speed $w_2$. To illustrate, consider the following Table 1 wherein three different null spin rates $w_2(1)$, $w_2(2)$, and $w_2(3)$ are assumed, with $w_2(1) < w_2(2) < w_2(3)$, about each of which the molecule rotation $w_2$ can vary in units of 1, 2, and 3 so as to effect a change in the fluid resistance (also expressed in units).

TABLE I

| Null molecule initial spin rate | Change in molecule initial spin rate | Change in fluid resistance |
| --- | --- | --- |
| $w_2(1)$ | ±1 | ±1 |
|  | ±2 | ±3 |
|  | ±3 | ±4 |
| $w_2(2)$ | ±1 | ±4 |
|  | ±2 | ±6 |
|  | ±3 | ±7 |
| $w_2(3)$ | ±1 | ±2 |
|  | ±2 | ±3.5 |
|  | ±3 | ±5 |

Figure 2:
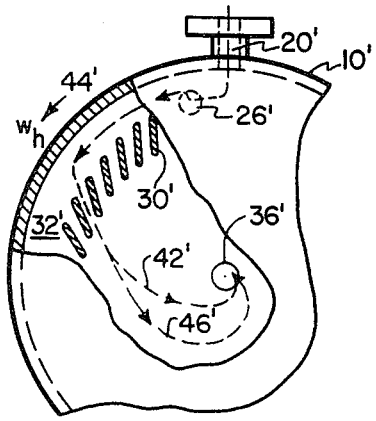
FIGURE 2 is a partially cut away view of a modification of the invention having means whereby an induced tangential velocity component is imparted to the vortex fluid at zero spin speed of the device.

It is therefore seen from Table 1 above that maximum sensitivity or gain of the system is provided if the null spin rate $w_2(2)$ can be employed about which molecule rotational speed changes occur. However, such a spin rate $w_2(2)$ might, for certain systems wherein the FIGURE 1 embodiment is used, require an angular rotation $w_h$ of housing 10 which is higher than is provided by the mechanical drive system. It is therefore proposed as another feature of the present invention that vanes 30 be non-radially directed in the manner of FIGURE 2 so as to impart an initial tangential velocity component $Vt_2$ other than zero to the fluid molecules passing therebetween for the condition of housing 10 zero spin, i.e. in the absence of housing 10 rotation. In FIGURE 2, like components are identified by primed numbers corresponding to numbers in FIGURES 1a and 1b. Thus, vanes 30' are now shown as oriented so that the fluid flow path through the hollow interior portion 24' when housing 10 is stationary, is as indicated by dash line 42' or in other words, is non-radial when compared to the radial path 42 in FIGURE 1a. When housing 10 is now rotated in the direction of arrow 44' at speed $w_h$, then the flow path of the fluid molecules becomes as shown by path 46' because housing angular momentum is now added thereto. If $w_v$ is taken to represent the angular velocity given fluid molecules by vanes 30' in the absence of housing rotation, then the value of $w_2$ in Equation 2 above becomes equal to $w_h + w_v$. This therefore makes Equation 6 above $Vt_2 = R_2(w_h + w_v)$ so as to make Equation 8 equal to the following:

$$Vt_3 = \frac{R_2^2}{R_3} w_2 = \frac{R_2^2}{R_3} (w_h + w_v)$$

It will now be appreciated that if the housing 10 angular speed $w_h$ is less than the maximized null spin $w_2(2)$ shown in Table 1, vanes 30' can be set to a non-radial direction so as to provide an initial molecule tangential velocity $w_v$ (at radius $R_2$) which, when added to the housing velocity $w_h$, will equal the maximized null spin rate $w_2(2)$. Thus, a plot of change in fluid resistance versus change in spin rate $w_h$ will result in a curve which can be shifted in order to obtain the maximum gain or sensitivity by inducing a tangential molecule velocity component at zero housing spin through use of the non-radial orientation of vanes 30'.

Figure 3:
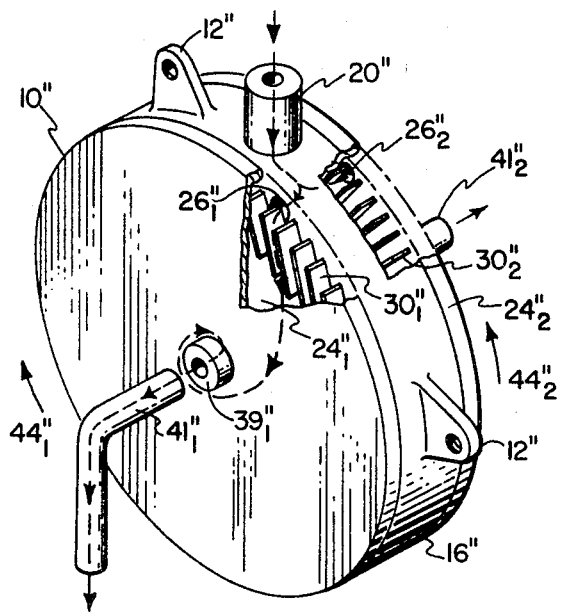
FIGURE 3 illustrates an embodiment of the invention wherein a push-pull effect is provided by the duplication of components.

By utilizing two vortex spin sensor configurations in the same housing, a push-pull device can be built for use in a bridge detecting circuit. In one sensor configuration a molecule spin at zero housing rotation is induced in one direction, whereas in the other sensor configuration the induced molecule spin at zero housing rotation is in the opposite direction. Any housing rotation therefore reduces the molecule spin (and hence fluid resistance) in one sensor configuration while simultaneously increasing the fluid resistance in the other sensor, so that the assembly becomes immune to changes in the fluid properties with respect to null speed. Such an embodiment is shown in FIGURE 3, where double primed numbers generally corresponding to numbers in FIGURES 1 and 2, are utilized for like elements. FIGURE 3 thus shows a central manifold air chamber 16" which receives air via conduit 20" from a supply not shown but similar to supply 18 in FIGURE 1a. Further included in FIGURE 3 is a first housing interior portion $24_1$" on one side of manifold 16", and a second housing interior portion $24_2$" on the opposite side thereof. Each interior portion further has an individual fluid exit port $36_1$" and $36_2$" (not shown in FIGURE 3) located on the axis of housing rotation. At radius $R_2$ in interior portion $24_1$" is a circumferentially spaced set of vanes $30_1$" oriented to impart a tangential velocity component $w_v(1)$ to fluid in the direction shown by arrow $44_1$" for zero spin of housing 10". Situated at radius $R_2$ in interior portion $24_2$" is a second set of vanes $30_2$" which are oriented to impart a tangential velocity component $w_v(2)$ to fluid molecules in a direction indicated by arrow $44_2$" for a housing 10" spin rate of zero. If housing 10" is now rotated in the direction of arrow $44_1$", the total initial molecule spin velocity $w_2(1)$ in portion $24_1$" is increased, whereas the total initial molecule spin velocity $w_2(2)$ in interior portion $24_2$" is decreased, and vice versa in the event that housing member 10" is instead rotated in the direction of arrow $44_2$". Consequently, spin of the entire assembly 10" reduces the fluid resistance in one sensor and increases the resistance in the other. By connecting the two sensor outputs in a bridge sensing circuit, any departure in housing spin from some predetermined null velocity may therefore be accurately sensed even though fluid characteristics change due to changes in temperature, density, or the like.

Figure 4:
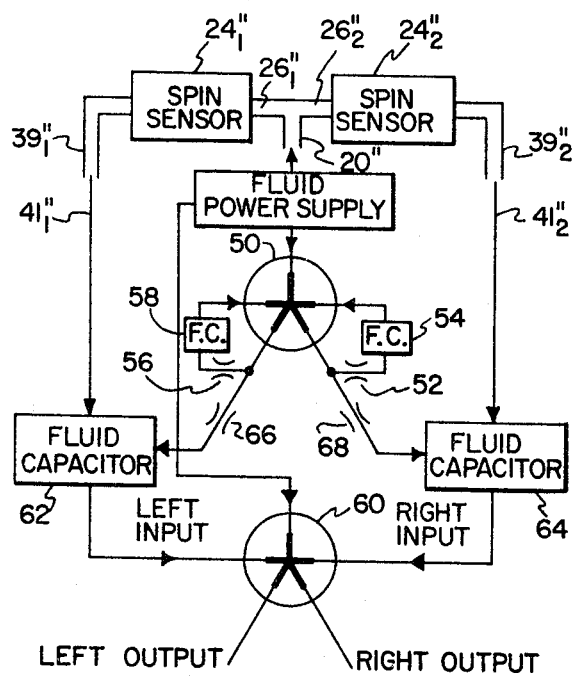
FIGURE 4 is a circuit schematic of a control system wherein the push-pull sensor device can be used.
Figure 5:
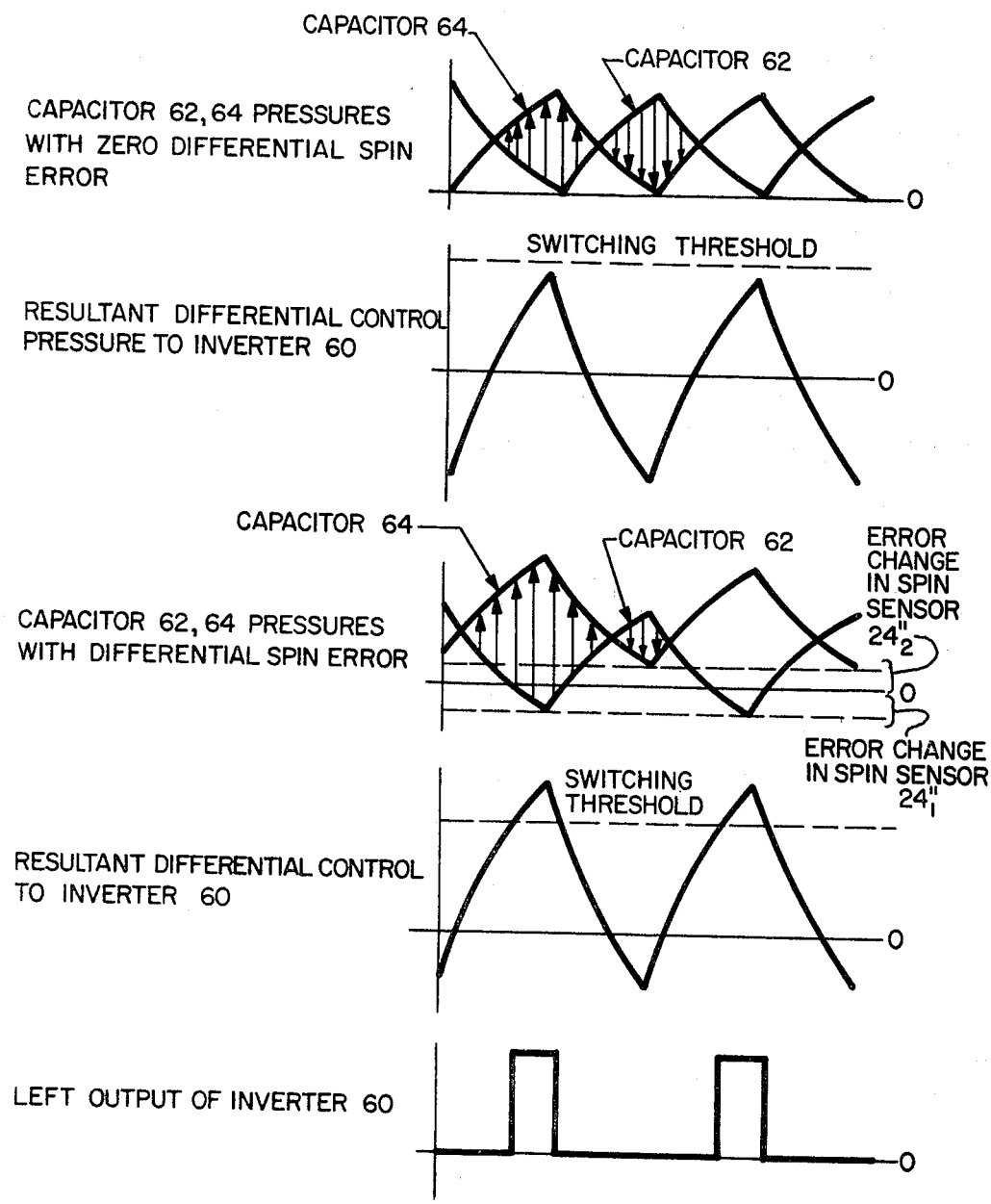
FIGURE 5 is a waveform diagram showing the operation of FIGURE 4.

FIGURE 4 is a schematic diagram of a typical fluid bridge sensing circuit wherein the push-pull spin sensor of FIGURE 3 finds particular, although not exclusive, use. This circuit is designed for use in a fluid pulse-width modulation control system, whereby the spin rate of some mechanical mass is to be maintained at or below a predetermined speed by generation of fluid error pulses whose duration is indicative of the degree of departure of the mass above the assigned velocity. FIGURE 5 shows operating waveforms of the FIGURE 4 circuit. In the electronic field, control systems using pulse-width modulation have been in use for many years, and the art is well established. In the hydraulic and pneumatic control field, however, pulse-width modulation has heretofore not been widely used, not because the same theoretical advantages did not exist, but because of the lack of switching elements, such as valves with high enough speeds and sufficient life to be practical. With the advent of pure fluid amplifiers, however, such switching elements now are available.

The basic pulse rate is determined by a pure fluid oscillator. This oscillator consists of nothing more than a pure fluid-flip-flop 50 with an RC network in each output leg feeding back a portion of the output signal to the control inputs.

If the power jet is issuing from the right-hand leg of flip-flop 50 a portion of the output is bled through a resistance 56 into a capacitor 58. The pressure in capacitor 58 will rise until it is sufficient to switch the flip-flop to the opposite output. The identical process takes place on the opposite side, via resistance 52 and capacitor 54, and thus flip-flop 50 will switch back and forth at a rate which depends upon the product of the resistance and capacitance in the feedback path. The output wave forms of the oscillator will be very nearly square waves whose amplitude will be independent of frequency over a very broad range.

The value of the fluid capacitance in the feedback path may vary appreciably with changes in the pressure and density of the gas. However, so long as the frequency remains high compared with the natural frequency of the mass itself, even relatively large changes in oscillator frequency will have an insignificant effect on the overall system characteristics.

The next consideration is to vary the effective duty cycle of the oscillator pulses in accordance with an error signal. To do this an asymmetrical digital fluid amplifier 60 is used wherein the flow is normally out one leg, for example, the right-hand leg, until the pressure differential across the two control inputs exceeds some given threshold value. When this happens the flow will switch to the left-hand leg, but there is no "memory" (as in a flip-flop), and the flow will again return to the right-hand leg as soon as the pressure differential at the inputs decreases below the threshold. Such a device is commonly known as an inverter.

Each of the signals coming from the two spin sensors $24_1$" and $24_2$" may be considered to consist of a D-C level superimposed on which is the error signal. This D-C level is the sensor output obtained at the time when the mechanical mass is spinning at the desired predetermined velocity. By appropriately constructing each sensor $24_1$" and $24_2$" (e.g. orienting vanes 30" to the proper degree), the D-C levels from the sensors can be made identical since they have the same common power supply. Thus, since the outputs from the sensors effectively go to the opposing control inputs of the pulse-width modulating inverter 60 the D-C component may be ignored in the waveform diagrams of FIGURE 5.

Each output of the oscillator 50 goes to a fluid capacitor 62, 64 through a resistor 66, 68. While the outputs of the oscillator itself are square waves the pressure wave forms in each of the capacitors 62, 64 would be approximately triangular due to the integrating effect of the capacitors (see FIGURE 5). Outputs from capacitors 62, 64 are taken to the two control inputs of the inverter 60. With no error signal present the peak differential pressure across the inverter controls is just barely below the switching threshold, and all flow continues to issue from the right-hand leg of inverter 60.

As can be seen from FIGURE 5, the sensor outputs are also injected via fluid isolators 39–41 into capacitors 62, 64, and thus as soon as the mass spin rate deviates from that desired, there is an unbalance in the sensor outputs which will shift the D-C level in the capacitors and thereby cause the pressure in one to rise and in the other to fall. If the mass has slowed below the desired spin rate this change in levels merely reinforces the tendency for the inverter flow to remain in the right-hand leg. If, however, the mass has speeded up beyond the desired spin rate the shift in capacitor levels is such that the peak value of the pressure difference is raised above the switching threshold for a part of the cycle, during which time fluid flows from the left output of inverter 60. This fluid pulse from the left output can be used by speed adjusting mechanism to return the mass to its desired spin rate, or alternatively, the right output signal from inverter 60 can be first applied to a power inverter for this same purpose. The length of time that the threshold is exceeded depends, of course, on the magnitude of the error signal, and by setting the circuit parameters properly, this length of time can be made to vary from zero (with no error signal) to a full cycle width when maximum corrective torque is required. The output of the inverter then will be a rectangular pulse of uniform amplitude ideally, the width of the pulse alone varying from zero degrees for no error to a full 360 degrees at error saturation.

While several embodiments of the invention have been shown and/or described, modifications of same will be readily apparent to those skilled in the art without departing from the novel principles defined in the appended claims.

The embodiments of the invention in which an exclusive property or privilege is claimed are defined as follows:

1. A push-pull fluid spin sensor device comprising:
   (a) a housing member mountable for rotation in at least one plane about an axis, said housing member having a first hollow interior portion extending parallel with said plane of rotation from said axis of rotation at least to a first predetermined distance therefrom, and a second hollow interior portion isolated from said first hollow interior portion and extending parallel with said plane of rotation from said axis of rotation at least a second predetermined distance therefrom;
   (b) a first fluid entrance means carried by said housing member which is located at said first predetermined distance in communication with said first hollow interior portion, and second fluid entrance means carired by said housing member which is located at said second predetermined distance in communication with said second hollow interior portion, where each of said first and second fluid entrance means provides a path for fluid flow into its respective first and second hollow interior portions which is parallel to said plane of rotation, and is shaped to transfer angular momentum of said housing member to fluid molecules passing therethrough, with said first fluid entrance means being oriented to cause fluid molecules passing therethrough to have a non-radially directed flow path in one direction into said first hollow interior portion, and with said second fluid entrance means being oriented to cause fluid molecules passing therethrough to have a non-radially directed flow path in the opposite direction into said second hollow interior portion; and
   (c) first fluid exit means from said housing member which is located at said axis of rotation in communication with said first hollow interior portion, and which is spaced apart from said first fluid entrance means by a third predetermined distance through said first hollow interior portion nearly equal to said first predetermined distance, and second fluid exit means from said housing member located at said axis of rotation in communication with said second hollow interior portion, and which is spaced apart from said second fluid entrance means by a fourth predetermined distance through said second hollow interior portion nearly equal to said second predetermined distance.

2. A device according to claim 1 wherein said first fluid entrance means and said second fluid entrance means each comprises a plurality of spaced apart vanes.

3. A device according to claim 1 wherein said first fluid exit means and said second fluid exit means respectively comprise a first and a second fluid exit port each in said housing member and whose fluid flow area lies parallel with said plane rotation.

4. A device according to claim 3 wherein said first fluid entrance means and said second fluid entrance means each comprises a plurality of spaced apart vanes.

5. A device according to claim 3 which further includes first and second fluid recovery channels located externally to said housing member and each respectively in line with said first and second fluid exit ports, each of said first and second recovery channels having its inlet spaced apart from its respective fluid exit port by a distance equal to several diameters of its respective fluid exit port.

References Cited

UNITED STATES PATENTS

| | | | |
|---|---|---|---|
| 3,063,295 | 11/1962 | Dowdell | 73—194 |
| 3,203,237 | 8/1965 | Ogren. | |
| 3,261,209 | 7/1966 | Rae | 73—505 |
| 3,276,259 | 10/1966 | Bowles et al. | 73—505 XR |
| 3,233,622 | 2/1966 | Boothe | 137—81.5 |

JAMES J. GILL, *Primary Examiner.*